Patented Oct. 17, 1933

1,931,364

UNITED STATES PATENT OFFICE 1,931,364

PROCESS OF PURIFYING TECHNICAL SODIUM PYROSILICATE HYDRATES

Myron C. Waddell, Lakewood, Ohio, assignor to The Grasselli Chemical Company, Cleveland, Ohio, a corporation of Delaware No Drawing. Application October 25, 1932
Serial No. 639,535

5 Claims. (Cl. 23—110)

My invention may be practiced for example as follows: Sodium pyrosilicate hydrate crystals are produced from solutions containing the proper excess of caustic soda as disclosed in my above cited application. The crystals are separated as completely as possible from their mother liquor, as by centrifuging. A solution of sodium silicate of a ratio for instance $1Na_2O:2SiO_2$ is then mixed thoroughly, preferably by spraying, with the centrifuged crystals in such an amount that the free caustic in the crystal mass is converted to sodium pyrosilicate. The addition is made slowly in order not to obtain a sticky, gummy mass. The loose, damp crystal mass is then dried in any suitable apparatus, preferably by tumbling in a slow current of warm air. The crystals are then in a dry, free-flowing condition ready for packaging and storage.

As a specific example of how my invention has been applied to the purification of a crude, crystalline pyrosilicate hydrate the following is given:

A crude, technical sodium pyrosilicate hydrate was available which contained 37.1% $Na_2O$ and 22.7% $SiO_2$, this contained therefor 2.5% excess NaOH. 700 grams of this product were carefully sprayed and thoroughly mixed with 58 grams of a silicate solution containing 22.6% $SiO_2$ and 11.6% $Na_2O$, the mix was then air dried rapidly, it gave a free-flowing product, showing an analysis 36.2% $Na_2O$ and 24.1% $SiO_2$, or an excess of 1.1% $SiO_2$ over the theoretical for pyrosilicate.

From these analytical data one obtains the formula of this product as

$3Na_2O.2.07SiO_2.11.3H_2O$ which corresponds closely to a more or less moist pyrosilicate containing about 10 mols of water of crystallization. It will be understood that it is quite impractical to produce on air drying technical silicates which have the water content corresponding exactly to the formula of a definite hydrate. For practical purposes this is quite unnecessary as the products are mostly used in aqueous solutions. Keeping in mind that the deca hydrate is the most stable, and probably the only definitely known pyrosilicate hydrate, one can easily by ordinary stoechiometric calculations calculate in advance from the analytical data of the raw, impure pyrosilicate and the treating liquor, the amount of water required to produce a final deca or other desired hydrate.

I have shown in my co-pending application Ser. #639,534 filed on even date herewith that novel crystalline sodium pyrosilicate hydrates of the composition $Na_6Si_2O_7.XH_2O$, in which X is about 10, can be obtained by cooling hot, concentrated solutions of sodium pyrosilicate containing substantial amounts of free caustic alkali, i.e. in excess to that corresponding to the pyrosilicate ratio of $3Na_2O:2SiO_2$. The resulting crystals contain, however, due to contaminating mother liquor, some free caustic alkali. This adhering mother liquor causes difficulty in drying the pyrosilicate hydrate crystals and it is the aim of the present invention to free the crystals from this free caustic alkali.

My invention relates therefor to the elimination of free caustic alkali contained in the mother liquor adhering to the sodium pyrosilicate hydrate crystals obtained by crystallization of strongly alkaline pyrosilicate solutions and it consists in neutralizing said free caustic and transforming it into pyrosilicate. A very convenient manner of transforming said free caustic into pyrosilicate consists in treating the crude, technical pyrosilicate hydrate crystals with a predetermined amount of a sodium silicate solution in which the ratio of $SiO_2$ to $Na_2O$ is greater than that of the pyrosilicate, i.e. the solution contains more $SiO_2$ than corresponds to the pyrosilicate ratio of $3Na_2O:2SiO_2$. Any sodium silicate having a ratio of $Na_2O:SiO_2$ from 1:1 to as high as 1:4 can be used in my process, but a silicate of a 1:2 ratio has been found particularly satisfactory for this purpose since it has a high neutralizing value for the adsorbed caustic soda and is not too viscous to mix readily into the crystal mass.

I claim:

1. In a process of purifying a technical, crystalline sodium pyrosilicate hydrate contaminated with free caustic alkali, the step of transforming said free alkali into sodium pyrosilicate hydrate.

2. In a process of purifying a technical, crystalline sodium pyrosilicate hydrate contaminated with free caustic alkali, the step of mixing said product with a sodium silicate solution containing more $SiO_2$ than corresponds to the ratio $3Na_2O:2SiO_2$.

3. In a process of purifying a technical, crystalline sodium pyrosilicate hydrate contaminated with free caustic alkali, the step of mixing said product with a sodium silicate solution of a composition and in an amount adjusted to transform said free alkali into sodium pyrosilicate.

4. In a process of purifying a technical, crystalline sodium pyrosilicate hydrate contaminated with free caustic alkali, the steps of mixing said product with a sodium silicate solution containing more $SiO_2$ than corresponds to the ratio $3Na_2O:2SiO_2$, the amount and composition of said added silicate being adjusted to transform said free alkali into additional solid pyrosilicate hydrate.

5. The process of claim 4 in which the sodium silicate solution added has a ratio of about $1Na_2O:2SiO_2$ and is sprayed upon the technical pyrosilicate hydrate.

MYRON C. WADDELL.